United States Patent
Ramamoorthy et al.

(10) Patent No.: US 10,051,081 B2
(45) Date of Patent: Aug. 14, 2018

(54) METHOD AND SYSTEM FOR MANAGING PROFILES

(75) Inventors: Arun Prasath Ramamoorthy, Bangalore (IN); Basavaraj Jayawant Pattan, Bangalore (IN); Jae-Kwon Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 460 days.

(21) Appl. No.: 13/125,689

(22) PCT Filed: Oct. 21, 2009

(86) PCT No.: PCT/KR2009/006094
§ 371 (c)(1),
(2), (4) Date: Apr. 22, 2011

(87) PCT Pub. No.: WO2010/047530
PCT Pub. Date: Apr. 29, 2010

(65) Prior Publication Data
US 2011/0202600 A1 Aug. 18, 2011

(30) Foreign Application Priority Data

Oct. 22, 2008 (IN) .......................... 2583/CHE/2008
Oct. 15, 2009 (KR) ........................ 10-2009-0098347

(51) Int. Cl.
*G06F 15/16* (2006.01)
*H04L 29/08* (2006.01)
*H04L 29/06* (2006.01)

(52) U.S. Cl.
CPC ............ *H04L 67/306* (2013.01); *H04L 67/02* (2013.01); *H04L 67/36* (2013.01); *H04L 65/1016* (2013.01)

(58) Field of Classification Search
USPC .......................... 709/201, 203, 217, 223, 225
See application file for complete search history.

(56) References Cited

U.S. PATENT DOCUMENTS 6,867,733 B2 * 3/2005 Sandhu ................. G01S 5/0072
342/357.34
6,976,092 B1 12/2005 Daniell et al.
(Continued)

FOREIGN PATENT DOCUMENTS

WO WO 2008/016263 2/2008

OTHER PUBLICATIONS

"Common Policy: A Document Format for Expressing Privacy Preferences," H. Schulzrinne et al., Internet Engineering Task Force (IETF) Request for Comments (RFC) 4745, Feb. 2007.*
(Continued)

*Primary Examiner* — Phyllis A Book
(74) *Attorney, Agent, or Firm* — The Farrell Law Firm, P.C.

(57) ABSTRACT

A method and system for managing profiles is provided. The method includes maintaining Profile Information of one or more service recipients in a Profile Registrar XDMS. The method also includes identifying an Active Profile of a user from a Profile Registrar document in response to an input indicative of communication request for an address of record of the user. Further, the method includes obtaining user preferences associated with the Active Profile and applying the user preferences to the communication request or the service provisioning to the user. The system includes an extensible markup language data management server, a communication interface in electronic communication with a network to send and receive signals, and a processor.

8 Claims, 7 Drawing Sheets

(56) References Cited

U.S. PATENT DOCUMENTS

| | | | |
|---|---|---|---|
| 7,043,480 B2* | 5/2006 | Trivedi | G06F 17/30589 |
| 7,080,122 B2* | 7/2006 | Bilbrey et al. | 709/206 |
| 7,240,364 B1* | 7/2007 | Branscomb et al. | 726/9 |
| 7,454,195 B2* | 11/2008 | Lewis et al. | 455/412.1 |
| 7,818,396 B2* | 10/2010 | Dolin | G06Q 30/02 |
| | | | 707/709 |
| 7,877,082 B2* | 1/2011 | Eagle et al. | 455/414.1 |
| 8,218,735 B2* | 7/2012 | Brunson et al. | 379/88.12 |
| 8,230,003 B2* | 7/2012 | Oh et al. | 709/203 |
| 8,301,729 B2* | 10/2012 | Oh | 709/219 |
| 8,407,344 B2* | 3/2013 | Zabawskyj et al. | 709/225 |
| 8,489,669 B2* | 7/2013 | Johnson | 709/203 |
| 2003/0224760 A1 | 12/2003 | Day | |
| 2005/0174975 A1* | 8/2005 | Mgrdechian | G06Q 30/0207 |
| | | | 370/338 |
| 2006/0203811 A1* | 9/2006 | Aoki | H04L 67/306 |
| | | | 370/356 |
| 2006/0224675 A1* | 10/2006 | Fox | G06Q 10/00 |
| | | | 709/206 |
| 2007/0153777 A1 | 7/2007 | Coulas et al. | |
| 2007/0157247 A1 | 7/2007 | Cordray et al. | |
| 2007/0189301 A1 | 8/2007 | Kiss et al. | |
| 2007/0276947 A1 | 11/2007 | Panattu et al. | |
| 2008/0028036 A1* | 1/2008 | Slawson et al. | 709/217 |
| 2009/0182806 A1* | 7/2009 | Shivaji-Rao | 709/203 |
| 2009/0193329 A1* | 7/2009 | Oh | G06F 17/30699 |
| | | | 715/234 |
| 2010/0067679 A1* | 3/2010 | Lei | H04L 67/24 |
| | | | 379/201.02 |
| 2010/0325192 A1* | 12/2010 | Lee et al. | 709/202 |
| 2011/0093577 A1* | 4/2011 | Lee et al. | 709/223 |

OTHER PUBLICATIONS

PCT/ISA/237 Written Opinion issued on PCT/KR2009/006094 (3 pp.).
PCT/ISA/210 Search Report issued on PCT/KR2009/006094 (4 pp.).
European Search Report dated Apr. 25, 2017 issued in counterpart application No. 09822206.0-1853, 7 pages.
Chinese Office Action dated May 28, 2013 issued in a counterpart application No. 200980151946.5.

* cited by examiner

METHOD AND SYSTEM FOR MANAGING PROFILES

PRIORITY

This application claims priority under 35 U.S.C. § 119(a) to Korean Patent Application No. 10-2009-0098347 filed in the Korean Intellectual Property Office on Oct. 15, 2009, to Indian Patent Application No. 2583/CHE/2008 filed in the Indian Intellectual Property Office on Oct. 22, 2008 and to PCT Application PCT/KR2009/006094 filed Oct. 21, 2009, the content of each which is incorporated herein by reference.

BACKGROUND OF THE INVENTION

1. Field of the Invention

The present invention relates generally to the field of multimedia communication. More particularly, the present invention relates to a method and a system for managing user preferences and profiles for the multimedia communication.

2. Description of the Related Art

Over a period of time, the number of services provided by network service providers has increased. The service providers allow a user to choose preferences to customize behavior of various applications, for example a messaging application, according to user needs. However, a tremendous number of preferences are available to the user and the user must manage the preferences for each application, which is difficult for the user to handle.

Currently existing techniques provides the user with an option to create user preference profiles for managing settings of various applications. A user may set preferences for various applications, which the user desires to implement delivery of services. The preferences can be saved in form of profiles on a server. The device can access the profiles stored on a server. When several profiles are created, at any particular point of time the user preferences that correspond to a profile are called as Active profile that must be retrieved and applied. Therefore, there is a need to identify the profile which is active.

In a conventional technique for identifying an Active Profile, profiles are added with identification tags. Each profile is searched for an identification tag indicative of activeness of that profile. However, the process is cumbersome and time consuming. Also, the resources consumed searching each profile results in cost inefficiency. The situation worsens when the user uses multiple devices and hence, has more number of profiles as compared to the scenario when the user uses only one device.

In light of the foregoing discussion, there is a need for a method and a system for managing profiles.

SUMMARY OF THE INVENTION

Embodiments of the present invention described herein provide a method and system for managing profiles.

The foregoing and/or other features and utilities of the present invention may be achieved by providing a method of managing profiles, the method including acquiring, by a client, a profile registrar document that provides active profile information, including information indicating a relationship between an Address of Record (AOR), a device identifier, and a profile registered to a user, upon receipt of an active profile change request for the device from the user, displaying, by the client, a profile list of profiles included in the profile registrar document; and sending, by the client, an active profile change request that includes identification information of a profile selected from the profile list by the user, an identifier of the device, and an AOR corresponding to the device.

The foregoing and/or other features and utilities of the present invention may be achieved by providing a method of managing profiles, the method including, upon receipt of a communication request from a device, acquiring a profile registrar document that provides active profile information, including information indicating a relationship between an Address of Record (AOR), a device identifier, and a profile registered in association with a recipient designated as a target of the communication request, searching the profile registrar document for an active profile corresponding to an AOR designated as a target of the communication request and an identifier of a device designated as the target of the communication request, acquiring a preference corresponding to the active profile, applying the preference to the communication request.

The present invention provides a convenient method and system for managing profiles by using a profile registrar document that provides active profile information, including information indicating a relationship between one or more AOR, one or more device identifiers, and one or more profiles.

BRIEF DESCRIPTION OF DRAWINGS

The above and other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

It should be observed that method steps and system components have been represented by conventional symbols in the figures, showing only specific details that are relevant for an understanding of the present invention. Further details that may be readily apparent to person ordinarily skilled in the art may not have been disclosed. In the present description, relational terms such as first and second, and the like, may be used to distinguish one entity from another entity, without necessarily implying any actual relationship or order between such entities.

Embodiments of the present invention described herein provide a method and system for managing profiles.

In various embodiments, a Profile Information consists of relationship between a profile, device and user address. Active Profile can be defined as a profile that needs to be applied for a combination of a user's devices, service and addresses of record.

Figure 1:
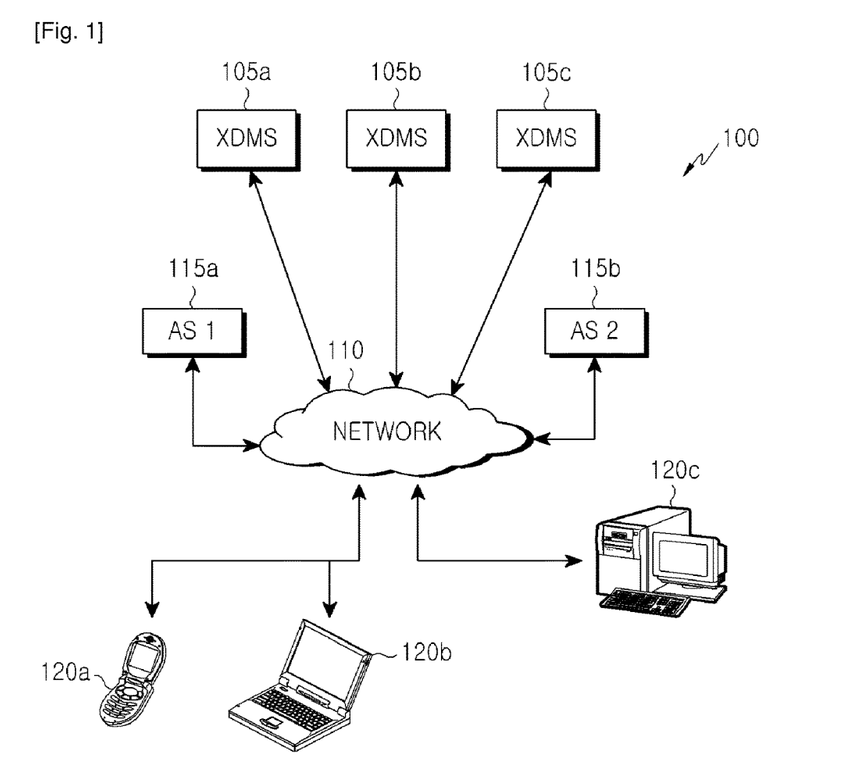
FIG. 1 is a block diagram of an environment in which various embodiments of the present invention are implemented.

FIG. 1 is a block diagram of an environment 100 in which various embodiments can be implemented. The environment 100 includes one or more devices, for example, a device 120a, a device 120b and a device 120c connected to each other via network 110. Examples of the devices include, but are not limited to, computers, laptops, mobile devices, data processing units computing devices, hand held devices, and personal digital assistants (PDAs). The device 120a, the device 120b and the device 120c may belong to different users, for example, the device 120a may belong to one user and devices 120b and 120c may belong to another user. Examples of the network 110 include, but are not limited to, Internet Protocol Multimedia Subsystem (IMS), Session Initiation Protocol (SIP) based system or any other wired or wireless network.

The environment 100 also includes one or more Application Servers, for example, an Application Server 115a (AS1), hereinafter referred to as "AS 115a", and an Application Server 115b (AS2), hereinafter referred to as "AS 115b". Each Application Server (AS) can be associated with a unique service. Examples of the applications include, but are not limited to, Converged Internet Protocol Messaging (CPM), Instant Messaging (IM), Push to talk over Cellular (PoC) or any other application. Examples of the Application Servers include but are not limited to X-share servers, Session Initiation Protocol (SIP) servers or any other Application Server. The environment 100 also includes one or more eXtensible markup language Data Management Server (XDMS) for example, a XDMS 105a, a XDMS 105b and a XDMS 105c connected to Application Servers through network 110. XDMS 105a is assumed to be a Profile Registrar XDMS. XDMS 105b and XDMS 105c are assumed to be repositories that contain the users' preferences on the application services as provisioned by the AS 115a or AS 115b. The AS 115a and AS 115b are connected to XDMS through network 110. The devices can also include a client corresponding to each application, for example a PoC client for the PoC application or an IM client for the IM application.

The XDMS 105a includes a Profile Registrar XDMS. The Profile Information document is stored in the Profile Registrar XDMS. The document can be a document in eXtensible Markup Language (XML) or HyperText Markup Language (HTML) or in other machine readable format. Examples of profiles include "Home", "Office" and "Travel". Each of the profiles identify a set of preferences. The preferences may be one of a device specific preference or a generic preference. The device specific preference is a preference which has to be applied per user device. The generic preference is a preference which has to be similarly applied to all devices of an user. The device specific and the generic preferences could exist together on the same XDMS depending on implementation option.

The user of device 120a sends data to the user of devices 120b and 120c through the network 110 using the application on the AS 115a. The AS 115a accesses a Profile Registrar document stored in the XDMS 105a and retrieves the Active Profile associated with the user on devices 120a. Further, the AS 115a obtains the generic and device specific preferences from at least one of XDMS 105b and XDMS 105c, associated with the Active Profile stored in the XDMS, and then implements the preferences corresponding to the communication request or service request to and from the device 120a.

The AS 115a accesses a Profile Registrar document stored in the XDMS 105a and retrieves the Active Profile associated with the user on devices 120b and 120c. Further, the AS 115a obtains the generic and device specific preferences from at least one of XDMS 105b and XDMS 105c, associated with the Active Profile stored in the XDMS, and then implements the preferences corresponding to the communication request to and from the device 120b. Further, the AS 115a implements the preferences corresponding to the communication to and from the device 120c. In one embodiment, Profile Information of a user can be stored in the same XDMS where the user preferences are stored, for example in either XDMS 105b or 105c.

The devices 120a, 120b, 120c and Application Server AS 115a and AS2 115b includes a plurality of elements for managing the profiles. The Application Server including the elements is explained in detail in regards to FIG. 2, and a device including the elements is explained in detail in regards to FIG. 3.

Figure 2:
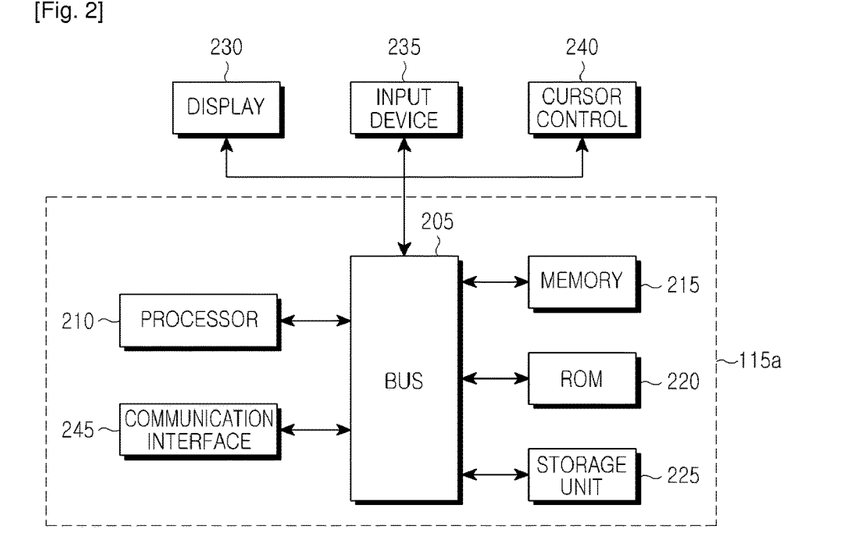
FIG. 2 is a block diagram of a server in accordance with an embodiment of the present invention.

FIG. 2 is a block diagram of the AS 115a, in accordance with an embodiment of the present invention. The AS 115a includes a bus 205 for communicating information, and a processor 210 coupled with the bus 205 for processing information. The AS 115a also includes a memory 215, for example a Random Access Memory (RAM) coupled to the bus 205 for storing information required by the processor 210. The memory 215 can be used for storing temporary information required by the processor 210. The AS 115a further includes a Read Only Memory (ROM) 220 coupled to the bus 205 for storing static information required by the processor 210. A server storage unit 225, for example a magnetic disk, hard disk or optical disk, can be provided and coupled to bus 205 for storing information.

The AS 115a can be coupled via the bus 205 to a display 230, for example a Cathode Ray Tube (CRT) or Liquid Crystal Display (LCD), for displaying information. An input device 235, including various keys, is coupled to the bus 205 for communicating information to the processor 210. In some embodiments, cursor control 240, for example a mouse, a trackball, a joystick, or cursor direction keys, is provided for communicating information to the processor 210 and for controlling cursor movement on the display 230 can also be present.

In one embodiment, the steps of the present invention are performed by the AS 115a using the processor 210. The information can be read into the memory 215 from a machine-readable medium, for example the server storage unit 225. In alternative embodiments, hard-wired circuitry can be used in place of or in combination with software instructions.

The term machine-readable medium can be defined as a medium providing data to a machine to enable the machine to perform a specific function. The machine-readable medium can be a storage media. Storage media can include non-volatile media and volatile media. The server storage unit 225 can be a non-volatile media. The memory 215 can be a volatile media. All such media must be tangible to enable the instructions carried by the media to be detected by a physical mechanism that reads the instructions into the machine.

Examples of the machine readable medium includes, but are not limited to, a floppy disk, a flexible disk, hard disk, magnetic tape, a CD-ROM, an optical disk, punch cards, paper tape, a RAM, a PROM, EPROM, and a FLASH-EPROM.

The AS 115*a* also includes a communication interface 245 coupled to the bus 205 for enabling data communication. Examples of the communication interface 245 include, but are not limited to, an Integrated Services Digital Network (ISDN) card, a modem, a local area network (LAN) card, an infrared port, a Bluetooth® port, a Zigbee® port, and a wireless port.

In some embodiments, the Application Server 115*a* can receive a request for communicating data among multiple devices. Further, the request is sent to the processor 210. The processor 210, upon receiving the request, identifies the sender or receiver and identifies the sending or receiving device, and retrieves the address of the respective devices. Further, the processor 210 obtains the Active Profile of the sending or receiving device and fetches preferences associated with the Active Profile. Based on the sending or the receiving device, the processor 210 implements the preference corresponding to the sending or the receiving device.

In some embodiments, the processor 210 can include one or more processing units for performing one or more functions of the processor 210. The processing units are hardware circuitry performing specified functions.

Figure 3:
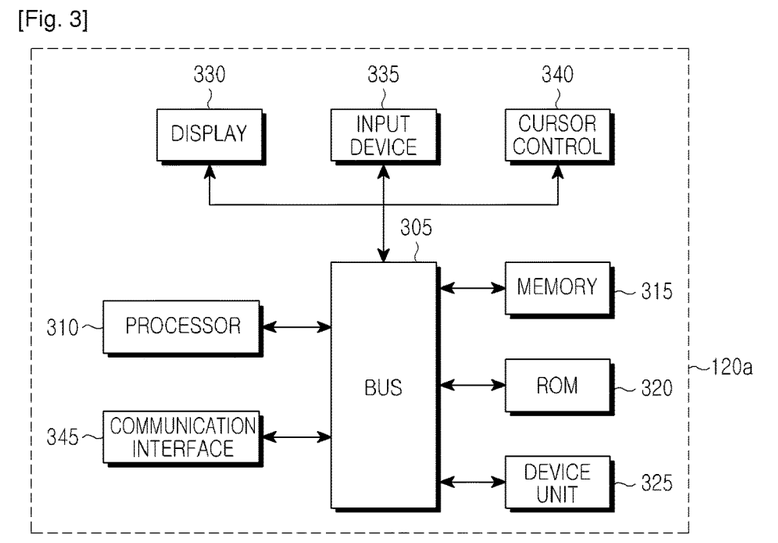
FIG. 3 is a block diagram of a device in accordance with an embodiment of the present invention.

FIG. 3 is a block diagram of the device 120*a*, which includes a bus 305 for communicating information, and a processor 310 coupled with the bus 305 for processing information. The device 120*a* also includes a memory 315, for example a RAM coupled to the bus 305 for storing information required by the processor 310. The memory 315 can be used for storing temporary information required by the processor 310. The device 120*a* further includes a ROM 320 coupled to the bus 305 for storing static information required by the processor 310. A device storage unit 325, for example a magnetic disk, hard disk or optical disk, can be provided and coupled to the bus 305 for storing information.

The device 120*a* can be coupled via the bus 305 to a display 330, for example a CRT or LCD, for displaying information. An input device 335, including various keys, is coupled to the bus 305 for communicating information to the processor 310. In some embodiments, cursor control 340, for example a mouse, a trackball, a joystick, or cursor direction keys for communicating information to the processor 310 and for controlling cursor movement on the display 330 can also be present.

In one embodiment, the steps of the present invention are performed by the device 120*a* using the processor 310. The information can be read into the memory 315 from a machine-readable medium, for example the device storage unit 325. In alternative embodiments, hard-wired circuitry can be used in place of or in combination with software instructions to implement various embodiments.

The term machine-readable medium can be defined as a medium providing data to a machine to enable the machine to perform a specific function. The machine-readable medium can be a storage media. Storage media can include non-volatile media and volatile media. The device storage unit 325 can be a non-volatile media. The memory 315 can be a volatile media. All such media must be tangible to enable the instructions carried by the media to be detected by a physical mechanism that reads the instructions into the machine.

Examples of the machine readable medium includes, but are not limited to, a floppy disk, a flexible disk, hard disk, magnetic tape, a CD-ROM, optical disk, punch cards, paper tape, a RAM, a PROM, EPROM, and a FLASH-EPROM.

The device 120*a* also includes a communication interface 345 coupled to the bus 305 for enabling data communication. Examples of the communication interface 345 include, but are not limited to, an integrated services digital network (ISDN) card, a modem, a local area network (LAN) card, an infrared port, a Bluetooth® port, a Zigbee® port, and a wireless port.

In some embodiments, the device 120*a* can send a request for communicating data among multiple devices. Further, the request is processed in AS 115*a*. Based on the active profile set for the multiple devices, the data sent by the device 120*a* is received by the multiple devices. In one embodiment, the device 120*a* can send a request to AS 115*a* to set an Active Profile. Based on the request, the profile registrar documents containing the Active Profile is received by the device 120*a*. The device 120*a* updates the Active Profile on the profile registrar documents and shares the profile registrar documents with the AS 115*a*.

Figure 4:
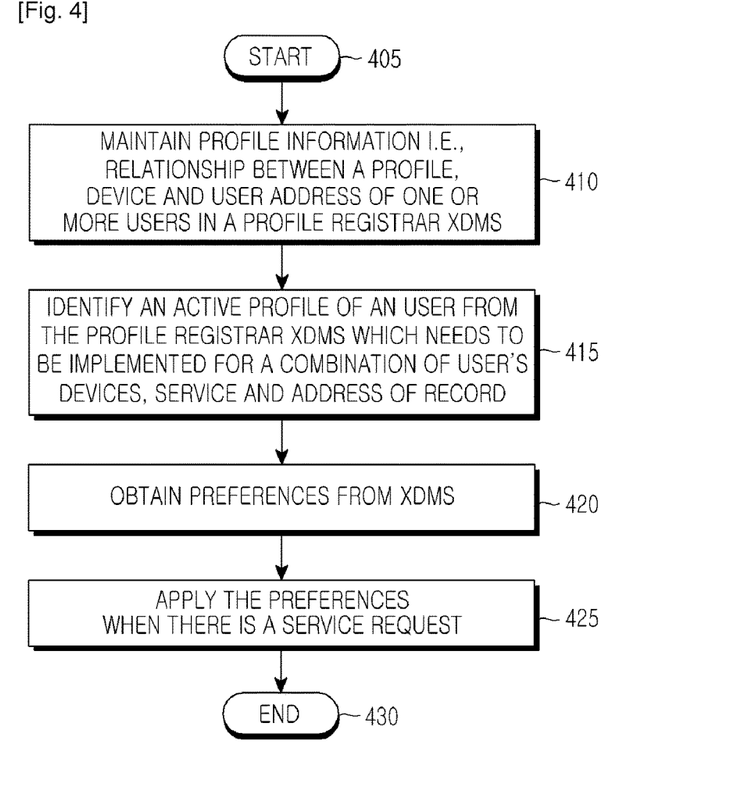
FIG. 4 is a flowchart illustrating a method for managing profiles in accordance with an embodiment of the present invention.

In some embodiments, the processor 310 can include one or more processing units for performing one or more functions of the processor 310. The processing units are hardware circuitry performing specified functions. FIG. 4 is a flowchart illustrating a method for managing profiles with the method starting at step 405.

At step 410, Profile Information of one or more recipients is electronically maintained in a Profile Registrar document in the Profile Registrar XDMS.

The Profile Registrar document in the Profile Registrar XDMS has all the information related to profiles, AORs of the user, and devices. Therefore, looking into this document allows for identification of the Active Profile which has to be applied to the user's device, per device address.

At least one of Application Server and one or more users can be authorized to access the Profile Registrar document in the Profile Registrar XDMS.

The user can create many profiles containing preferences, for example, home, office and travel. Based on the user request, the Profile Registrar XDMS is updated with the Active Profile indication, for example, which profile should be active with which user addresses and/or devices. Further, the user has the option of using the services from multiple devices. The user can specify different preferences for different devices. Further, the user can have multiple addresses and can choose to apply different preferences for the multiple addresses. For example, the preferences can be applied to multiple devices, multiple addresses and multiple services or to a specific device, a specific address and a specific service.

The user preferences can be categorized based on usage of the user and based on the application preferences. Some preferences are generic preferences and are applied to all of the user's devices, while some preferences are device specific and are applied only to a subset of user's devices. In some scenario, the user may have multiple addresses and may choose to apply some preferences to all or subset of the user's addresses. The user may choose a different set of generic preferences based on the address. For example, the user may want to apply personal generic preferences for personal devices while the user may choose to apply work related generic preferences for office devices.

Table 1 below provides an illustration of the Profile Registrar document. The Profile Registrar document can be a document in XML or HTML or in other machine readable format. The format of the Profile Registrar document begins with the root element tag "profile-set". The document includes a plurality of profile sub-elements, with each profile sub-element of the device and user address list containing one or more values. Other elements from differently named spaces may be present for the purpose of extensibility. Attributes associated with the profile element may be present including an identifier and type of the profile. The identifier includes a unique identifier for the profile. The examples of the type of the profile are "generic" and "device-specific".

Each profile element includes the sub-element "display-name" that includes the human-readable name of the profile. The profile element may also include the device-list and address-list sub-elements. The device-list element includes the list of devices for applying the profile. Multiple devices can be associated with the device list. The "device" element includes the identifier attribute carrying the unique identifier of the device. An address-list element is used to carry the list of addresses of the user to which a particular profile has to be applied. The "address-list" element may include one or more "address" sub-elements and each of these elements includes an attribute named Address Of Record (AOR). The value of the AOR attribute includes the address of the user. Based on the AOR the profile is applied. The "device-list" and "address-list" element can also include sub-element "all" indicating that a particular profile has to be applied to all of the user's addresses and devices.

TABLE 1

```
<?xml version="1.0" encoding="UTF-8"?>
<profile-set xmlns:ocp="urn:oma:xml:xdm:profile-registrar "
    xmlns:xsi="http://www.w3.org/2001/XMLSchema-instance">
<profile id="home_generic" type="generic" />
<address-list><all></address-list>
</profile>
<profile id="office_generic" type="generic" />
<profile id="travel_generic" type="generic" />
<profile id="profile1">
    <display-name>Home</display-name>
    <device-list>
        <device id="sip:userA@mobile1.sii.samsung.com"/>
    </device-list>
    <address-list>
        <address AOR="sip:personal_addr@korea.com"/>
    </address-list>
</profile>
<profile id="profile2">
    <display-name>Work</display-name>
    <device-list>
        <device id="sip:userA@mobile2.siso.samsung.com"/>
    </device-list>
    <address-list>
        <address AOR="sip:office_addr@samsung.com"/>
    </address-list>
</profile>
<profile id="profile3">
    <display-name> travel </display-name>
</profile>
</profile-set>
```

The Profile Registrar document in the example provided in Table 1 above includes the following components.

The user of the document has three generic preferences profiles named "home_generic", "office_generic" and "travel_generic". The user can choose "home-generic" profile to be applied for all of the user device addresses. The user has defined three device specific preferences identified by "profile1", "profile2" and "profile3". The user has chosen to apply "profile1" for the device "sip:userA@mobile1.sii.samsung.com" registered with the AOR "sip:personal_addr@korea.com". And the user has chosen to apply "profile2" for the device "sip:userA@mobile2.siso.samsung.com" registered with the AOR "sip:office_addr@samsung.com".

The Profile Registrar document maintains the list of profiles and their relationship with the devices and user addresses. The preferences may reside in different documents and it is the responsibility of the Application Server to fetch the preferences and apply the same to the communication requests.

The document residing in the Profile Registrar XDMS further includes information about managing profiles, making it easier for the user to manage the profiles as the information related to profiles, devices and AOR stored on the document residing on the Profile Registrar XDMS. Since the document is the single point of contact for managing the profiles, the user has the option of changing the implementation of preferences of other devices and addresses from any of the user's devices. Also, by accessing the document the user would be able to know the list of profiles defined and can choose any of listed profiles as Active Profile.

At step 415 of FIG. 4, an Active Profile of a recipient is identified from the Profile Registrar document which needs to be applied for a combination of user's devices, service and address.

The input signal includes data to be transmitted to the AOR of the recipient device. Upon receiving the input from a sender, the Application Server accesses the Profile Registrar document for identifying the Active Profile of the recipient. In one embodiment, the Application Server uses an eXtensible markup language Configuration Access Protocol (XCAP) GET operation for accessing the Profile Registrar document and obtaining the Active Profile of the recipient. The XCAP GET command can be accompanied by a device identifier and the AOR of the user for identifying the Active Profile that needs to be applied for a device.

At step 420 of FIG. 4, a preferences document is obtained from the XDMS where the preferences are stored.

At step 420, in another embodiment, upon the Application Server identifying the Active Profile, the Application Server fetches the corresponding preferences stored for the Active Profile. The preferences associated with the profile can be stored in a single document or in several documents.

At step 425, the obtained preferences are used for the Application Server to implement the service request when such request is received by the Application Server.

Upon obtaining the preferences of the recipient, the Application Server applies the same preferences to subsequent communication requests or service requests targeted to the recipient.

The service delivery may vary based on the preferences of the recipient when the preferences are specified or differentiated per the recipient. In some embodiments, the Application Server service delivery may vary based on the preferences of each device associated with the AOR when the preferences are further specified or differentiated per the device, AOR, and the recipient.

The method of FIG. 4 ends at step 430.

Figure 5:
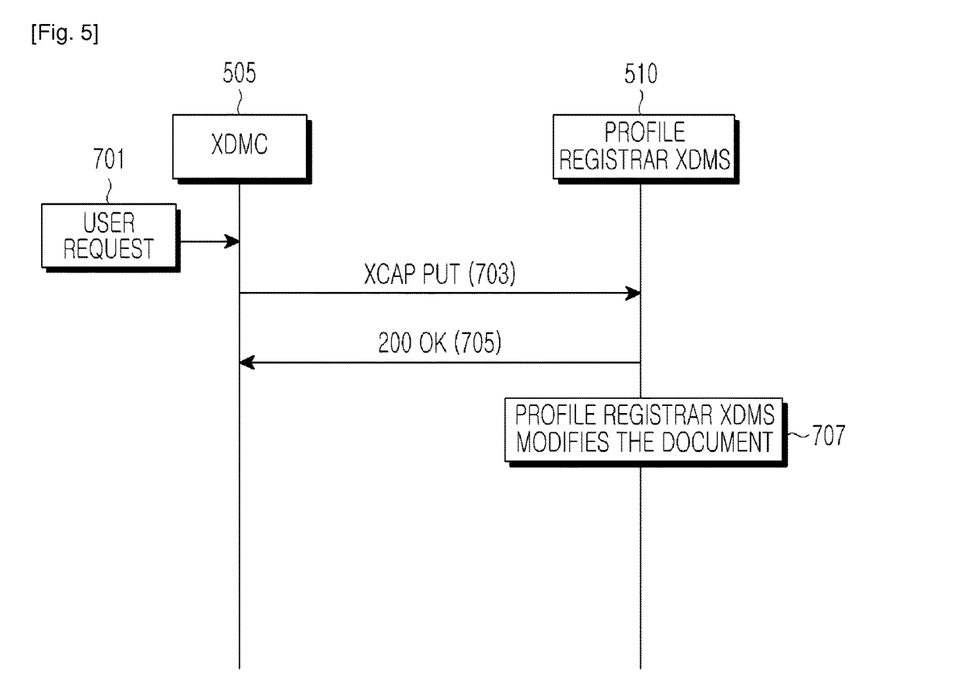
FIG. 5 is a flow diagram illustrating a method of managing profiles in eXtensible markup language Data Management Server (XDMS) in accordance with an embodiment of the present invention.

FIG. 5 is a flow diagram illustrating a method of managing profiles in XDMS.

In some embodiments, a user of a device can fetch the document through the existing XCAP GET operation to determine the profiles that have been activated for the user's devices. A user of a device can also effect changes in the Active Profile of the devices by storing the updated document through the existing XCAP PUT operation.

Upon the Extensible Data Management Client (XDMC) 505 receiving the request for changing a device's Active Profile in step 701, the XDMC 505 sends a message signal to the Profile Registrar XDMS 510 for changing the Active Profile of the device in step 703. The command can be a XCAP PUT operation. The device identifier, AOR and the Active Profile to be added are sent along with the message signal. The XDMC 505 can be embedded in the user's device, then receives such Active Profile change request from the user input to the user's device.

For example, with the reference to Table 1, the user of the device wants to change the Active Profile associated with the device whose id is <sip:userA@mobile1.sii.samsung.com> and the user whose registered address is <sip: personal_addr@korea.com>, from "Home" to "Work". For the sake of brevity, the present description uses the tuple sip:userA@mobile1.sii.samsung.com, sip: personal_addr@korea.com to indicate this relationship.

The XDMC 505 in the device must perform a XCAP PUT operation for replacing the content associated with the "Work" profile (or "profile2" profile) with the new content of the "Work" profile including the device identifier of the device and the AOR of the user. The XDMC 505 targets the XCAP PUT operation to the <profile id="profile2"> element, which describes the "Work" profile, to replace the profile with the content of Table 2 carried in the body of the XCAP PUT operation. When compared to the content of the "profile2" profile in Table 1, the content of the "profile2" in Table 2 adds the device id of <sip: userA@mobile1.sii.samsung.com> and the user address of <sip:personal_addr@korea.com>.

TABLE 2

```
<profile id="profile2">
   <display-name>Work</display-name>
   <device-list>
      <device id="sip:userA@mobile2.siso.samsung.com"/>
      <device id="sip:userA@mobile1.sii.samsung.com"/>
   </device-list>
   <address-list>
      <address AOR="sip:office_addr@samsung.com"/>
      <address AOR="sip:personal_addr@korea.com"/>
   </address-list>
</profile>
```

Table 2 is an example of profile content after the Active Profile is modified.

Upon receiving the XCAP PUT signal, the Profile Registrar XDMS 510 sends an acknowledgement signal (HTTP 200 OK) to the XDMC 505 (step 705).

The process of updating the Profile Registrar document includes additional implicit delete operations in step 707. For example, the XDMC 505 upon updating the device profile to "Work" profile, the XDMS 510 deletes the previous instance of that <device, AOR> from the "Home" profile (or "profile1" profile). For example, as shown in Table 3, the XDMS 510 can delete the instances of <sip: userA@mobile1sii.samsung.com, sip: personal_addr@korea.com> from the "Home" profile. Table 3 shows the resulting Profile Registrar document after these procedures to update the Active Profile for the device.

TABLE 3

```
<?xml version="1.0" encoding="UTF-8"?>
<profile-set xmlns:ocp="urn:oma:xml:xdm:profile-registrar "
     xmlns:xsi="http://www.w3.org/2001/XMLSchema-instance">
   <profile id="home_generic" type="generic" />
   <address-list><all></address-list>
</profile>
<profile id="office_generic" type="generic" />
<profile id="travel_generic" type="generic" />
<profile id="profile1">
   <display-name>Home</display-name>
</profile>
<profile id="profile2">
   <display-name>Work</display-name>
   <device-list>
      <device id="sip:userA@mobile2.siso.samsung.com"/>
      <device id="sip:userA@mobile1.sii.samsung.com"/>
   </device-list>
   <address-list>
      <address AOR="sip:office_addr@samsung.com"/>
      <address AOR="sip:personal_addr@korea.com"/>
   </address-list>
</profile>
<profile id="profile3">
   <display-name> travel </display-name>
</profile>
</profile-set>
```

Table 3 is an example of the Profile Registrar document updated in profile1 after changing Active Profile to profile2.

Figure 6:
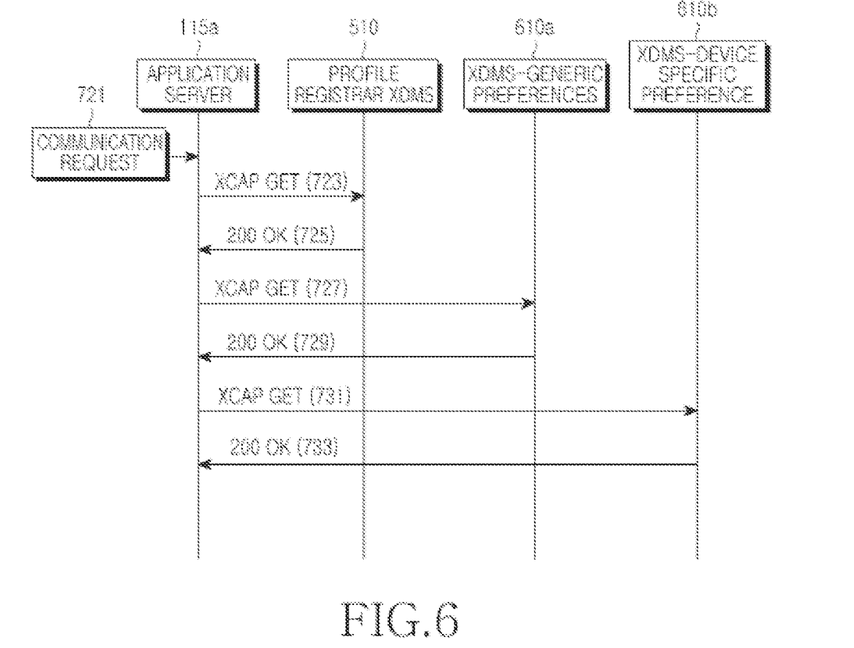
FIG. 6 is a flow diagram illustrating fetching of an Active Profile from a profile registrar document and corresponding preferences, in accordance with an embodiment of the present invention.

FIG. 6 is a flow diagram illustrating fetching of an Active Profile from a Profile Registrar document and then fetching the corresponding preferences.

FIG. 6 also illustrates fetching the Profile Registrar document for identifying Active Profile and accessing preferences stored in one or multiple locations associated with the Active Profile.

Upon receiving a request from a sender for communicating data to a recipient in step 721, an Application Server 115a sends an XCAP GET message to the Profile Registrar XDMS 510 to identify the Active Profile of the recipient user in step 723. The Profile Registrar XDMS 510 acknowledges the message with a 200 OK message in step 725. The acknowledgment message includes the Active Profile information of the Profile Registrar document. Based on the fetched information, the Application Server 115a identifies the Active Profile that needs to be applied to a recipient device. Further, the Application Server 115a needs to fetch the preferences of the Active Profile (i.e., the preferences that are valid for the Active Profile). The Application Server 115a sends another XCAP GET message to the XDMS-generic preference 610a storing the generic preferences to retrieve generic preferences associated with the Active Profile in step 727. The XDMS-generic preference 610a acknowledges the message with a 200 OK message and sends the generic preferences along with the acknowledgement in step 729. Further, the Application Server 115a sends yet another XCAP GET message to the XDMS-device specific preference 610b to retrieve device specific preferences associated with the Active Profile in step 731. The XDMS-device specific preference 610b acknowledges the message with a 200 OK message and sends the device specific preferences along with the acknowledgement in step 733.

An example of fetching the Profile Registrar document for identifying an Active Profile and accessing preferences stored in multiple locations associated with the Active Profile is provided below in conjunction with Table 1.

The Application Server 115a receives a communication request from a sender device targeted to the recipient user address of <sip:personal_addr@korea.com>. Currently the recipient user has registered only one device which is identified by <sip:userA@mobile1.sii.samsung.com>.

The Application Server 115a issues a XCAP GET to the Profile Registrar XDMS 510 to fetch the Profile Registrar document including the profile relationship.

The Profile Registrar XDMS 510 sends acknowledgement "200 OK" by including the Profile Registrar document in the body of the acknowledgement.

The Application Server 115a, on receiving the Profile Registrar document, parses Profile Registrar document to get the Active Profile for generic preferences and device specific preferences for the <sip:userA@mobile1.sii.samsung.com, sip:personal_addr@korea.com>, for example, for the registered recipient's device of <sip:userA@mobile1.sii.samsung.com> and the registered recipient's user address of <sip:personal_addr@korea.com>. For the example, based on Profile Registrar document as in Table 1, the Application Server 115a arrives at the following Active Profiles:

Generic Preferences: "home_generic"

Figure 7:
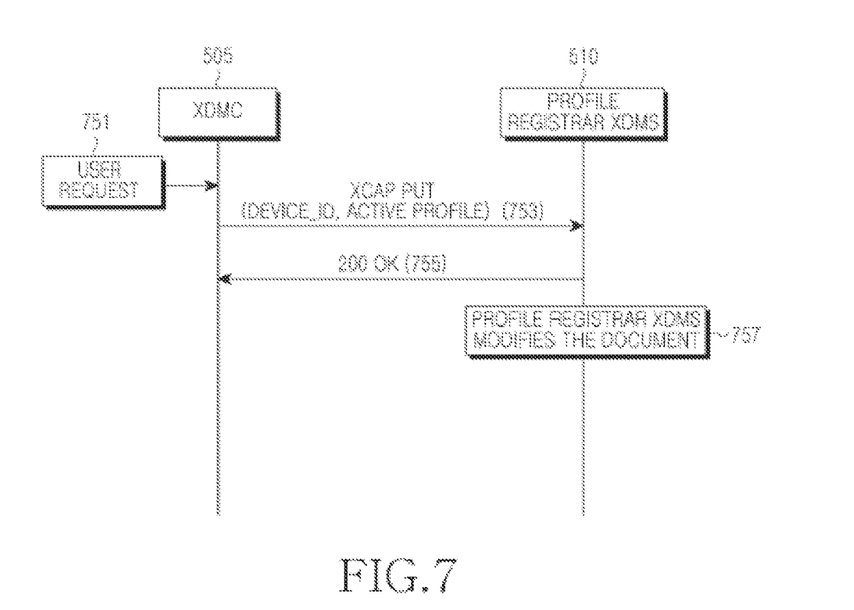
FIG. 7 is a flow diagram illustrating XDMS managing profiles using query parameters for indicating an Active Profile.

Active Profile. The device identifier parameter carries the unique ID of the device which is intending to use the profile specified in the parameter Active Profile as the Active Profile. The AOR parameter carries the AOR of a user corresponding to the device as specified in the "device identifier" parameter.

The following explains the steps involved in FIG. 7 in detail.

For example, consider that the user wants to change the profile associated with the device <sip:userA@mobile1.sii.samsung.com> and address <sip:personal_addr@korea.com> from current Active Profile "Home", which is a "profile1" profile according to the Profile Registrar document in Table 1, to new Active Profile "Work", which is "profile1" profile according to the Profile Registrar document in Table 1 in step 751.

The XDMC 505 residing in the user device has to perform a XCAP PUT operation for changing the Active Profile of the user device from "Home" to "Work" in step 753. The information is carried in the query parameters of the XCAP PUT request URI, which resemble the format shown in Table 4:

TABLE 4

PUT /org.openmobilealliance.profile-registrar/users/sip:personal_addr@korea.com/index?active_profile=profile2&device_id=sip:userA@mobile1.sii.samsung.com&AOR=sip:personal_addr@korea.com HTTP/1.1
Host: xcap.example.com
Via: HTTP/1.1 proxy.example.com (Apache/1.1)
User-Agent: XDM-client/OMA2.0
Date: Thu, 08 Jan 2007 10:50:37 GMT Device Specific Preferences: "home" (or "profile1")

The Application Server 115a fetches the preferences from the XDMS-generic preferences 610a by issuing the XCAP GET.

The XDMS-generic preferences 610a returns the preferences document in the acknowledgement.

The Application Server 115a fetches the preferences specific to the device "sip:userA@mobile1.sii.samsung.com" from the XDMS-device specific preferences 610b by issuing the XCAP GET.

The XDMS-device specific preferences 610b returns the preferences document in the acknowledgement.

The Application Server 115a, after fetching the preferences documents, will get the preferences related to the Active Profile and apply the same to the communication request targeted to the recipient.

In another example, the recipient preferences document may include a service list along with the profile identifier. In addition, the recipient may have multiple addresses and the recipient may choose to apply some preferences to all or to a subset of the recipient's device addresses.

FIG. 7 is a flow diagram illustrating XDMS managing profiles using query parameters for indicating an Active Profile.

The method illustrated in the FIG. 7 uses the query parameters in order to indicate the Active Profile to be used for a particular address and device instead of carrying the entire document in the body, as was explained in the illustration in reference to FIG. 5. The method illustrated in FIG. 7 is an optimized method i.e., no document in the body when compared to illustration in FIG. 5. Examples of the query parameters include, but are not limited to, an Active Profile, a device identifier and an AOR. The Active Profile parameter carries the profile id of the profile to be set as the Table 4 illustrates the format of a SIP message for changing the Active Profile.

The Profile Registrar XDMS 510 sends HTTP 200 OK to the XDMC 505 in step 755.

The XDMC 505 performs the XCAP PUT operation. The Profile Registrar XDMS 510 has to update the Profile Registrar document with some additional implicit delete operations (step 757). The Profile Registrar XDMS 510 makes sure to delete the previous instance of that <device, AOR> in the old profile. Hence, the Profile Registrar XDMS 510 can delete the instances of <sip:userA@mobile1.sii.samsung.com, sip:personal_addr@korea.com> from the "profile1" or the "Home" profile. Consequently, the resulting Profile Registrar document resembles the format Table 5.

TABLE 5

```
<?xml version="1.0" encoding="UTF-8"?>
<profile-set xmlns:ocp="urn:oma:xml:xdm:profile -registrar "
    xmlns:xsi="http://www.w3.org/2001/XMLSchema-instance">
<profile id= "profile1" >
  <display-name>Home</display-name>
</profile>
<profile id= "profile2" >
  <display-name>Work</display-name>
  <device-list>
    <device id= "sip:userA@mobile2.siso.samsung.com" />
    <device id= "sip:userA@mobile1.sii.samsung.com" />
  </device-list>
  <address-list>
    <address AOR= "sip:office_addr@samsung.com" />
    <address AOR= "sip:personal_addr@korea.com" />
  </address-list>
</profile>
<profile id=" profile3" >
  <display-name> travel </display-name>
```

TABLE 5-continued

```
    </profile>
  </profile-set>
```

Table 5 illustrates the Profile Registrar document after updating of the Active Profile.

In yet another embodiment, the process of changing profile as illustrated in FIG. 7 can be executed using HTTP POST.

Figure 8:
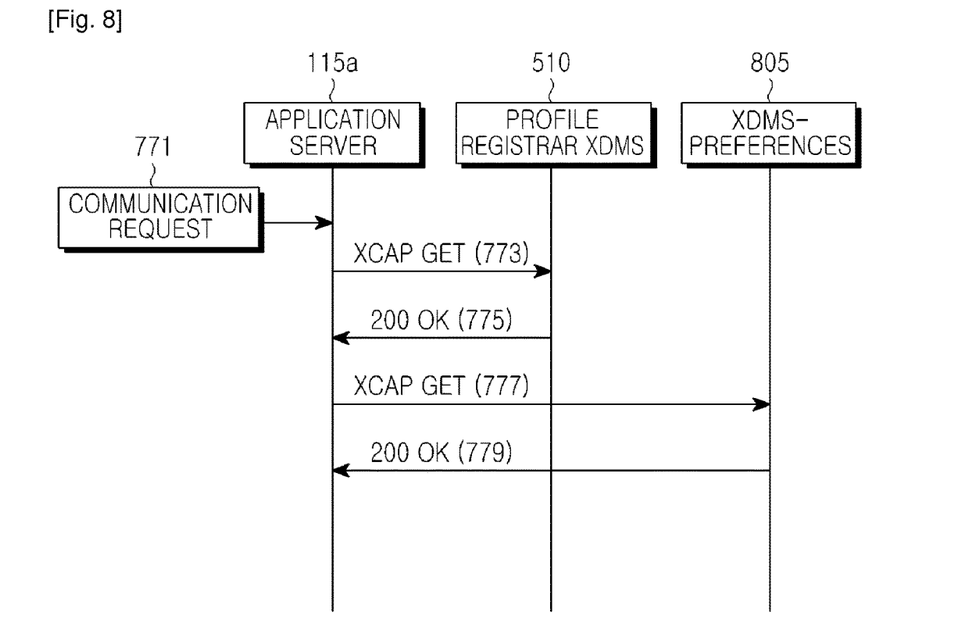
FIG. 8 is a flow diagram illustrating a method for fetching an Active Profile from a Profile Registrar document and corresponding preferences.

FIG. 8 is a flow diagram illustrating a method for fetching an Active Profile from a Profile Registrar XDMS and corresponding preferences, differing from the method illustrated in FIG. 6 in that there is no separation of preferences as generic preferences and device specific preferences. Rather, the preferences are stored in an XDMS and can indicate whether each preference is applicable to all profiles or to a specific profile. Hence, for the illustration as shown in FIG. 8, there is no separate generic preference XDMS and no device specific preference XDMS, but there is only one preference XDMS. The following Table 6 illustrates such user preference document that is stored in a single XDMS.

TABLE 6

```
<?xml version="1.0" encoding="UTF-8"?>
<ruleset xmlns="urn:ietf:params:xml:ns:common-policy"
          xmlns:ocp="urn:oma:xml:xdm:common-policy"
          xmlns:oxe="urn:oma:xml:xdm:xdm2-extensions"
  xmlns:xsi="http://www.w3.org/2001/XMLSchema-instance">
  <rule id="f3g44r1">
    <conditions>
      <sphere> profile1 </sphere>
      <identity>
        <one id="sip:percy.underwood@example.com"/>
      </identity>
      <oxe:media-list>
        <oxe:all-media-except>
          <oxe:pager-mode-message/>
        </oxe:all-media-except>
      </oxe:media-list>
      <oxe:service-list>
        <oxe:service enabler="OMA_IM"/>
        <oxe:service enabler="OMA_CPM"/>
      </oxe:service-list>
    </conditions>
    <actions>
      <oxe:allow-reject-invite>true</oxe:allow-reject-invite>
    </actions>
  </rule>
  <rule id="f3h44r1">
    <conditions>
      <sphere> profile2 </sphere>
      <identity>
        <one id="sip:nancy.underwood@example.com"/>
      </identity>
      <oxe:media-list>
        <audio/>
        <video/>
      </oxe:media-list>
      <oxe:service-list>
        <oxe:service enabler="OMA_CMP"/>
      </oxe:service-list>
    </conditions>
    <actions>
      <oxe:discard-message>true</oxe:discard-message>
    </actions>
  </rule>
  <rule id="f3hh44r1">
    <conditions>
      <sphere> profile1 </sphere>
      <identity>
        <one id="sip:basu@samsung.com"/>
      </identity>
      <oxe:service-list>
        <oxe:service enabler="OMA_CPM"/>
```

TABLE 6-continued

```
      </oxe:service-list>
    </conditions>
    <actions>
      <oxe:allow-parallel-media>audio video</oxe:allow-parallel-media>
    </actions>
  </rule>
</ruleset>
```

As shown in Table 6, each user preference may indicate a condition of which profile makes the corresponding user preference valid and applicable. For example, a user preference can indicate a condition specifying that the user preference becomes valid when the Active Profile is "Home" profile (or "profile1" according to Table 7), while another user preference can indicate a condition specifying that this user preference becomes valid when the Active Profile is "Work" profile (or "profile2" according to Table 7).

Assuming that the user preferences are applied using the format explained in RFC 4745, the <sphere> element of the <conditions> element can be used to carry the name and/or id of the profile to which this user preference belongs. Also, instead of using the <sphere> element, the <conditions> element can be extended to contain a new element which can carry the name of the profile to which the preference belongs. If the user wants the preference to remain part of all the profiles, the user can add the value <all> to the <sphere> element or the extended element. In other embodiments, if the <sphere> element does not exist for a preference, then the preference can be regarded as applicable irrespective of the profiles. If the preference is associated to a particular service or a list of services, then the services can be coupled together under each preference by having a <service-list> element.

The user preferences document illustrated in Table 6 carries the following considerations. In the user preferences document as shown in Table 6, the preferences are structured in a format similar to the format defined in RFC 4745. The preferences are grouped as a set of rules which has to be applied to the communication request by the Application Server. Each of the <rule> elements may have the <sphere> condition element which identifies the profile to which a particular rule belongs. For example the rule with the id="f3g44r1" is carrying the <sphere> condition element of value "profile1", the display name of which is "Home" in Table 7 (in other words, the "profile1" is the "Home" profile). This particular rule would be applied to the communication request by the Application Server when "profile1" profile or "Home" profile is made active and also other parts satisfied by the <conditions> element. When particular rules have to be made part of all the profiles, then the <sphere> condition would carry the value <all>. The present invention doesn't mandate that only the <sphere> element has to be used for identifying the profile to which a particular rule belongs. As an alternate, the <conditions> element can be extended to have a new child element which carries the details of the profiles to which a particular rule belongs. Further, if the user preferences are structured in other formats than the RFC4745 format, any other new elements or attributes can be used to deliver the above-described semantics.

Another example of the Profile Registrar document is illustrated in Table 7, when user preferences are in single XDMS.

TABLE 7

```
<?xml version="1.0" encoding="UTF-8"?>
<profile-set xmlns:ocp="urn:oma:xml:xdm:profile-registrar "
    xmlns:xsi="http://www.w3.org/2001/XMLSchema-instance">
  <profile id= "profile1" >
    <display-name>Home</display-name>
    <device-list>
      <device id= "sip:userA@mobile1.sii.samsung.com" />
    </device-list>
    <address-list>
      <address AOR= "sip:personal_addr@korea.com" />
    </address-list>
  </profile>
  <profile id= "profile2" >
    <display-name>Work</display-name>
    <device-list>
      <device id= "sip:userA@mobile2.siso.samsung.com" />
    </device-list>
    <address-list>
      <address AOR= "sip:office_addr@samsung.com" />
    </address-list>
  </profile>
  <profile id=" profile3" >
    <display-name> Travel </display-name>
    <device-list>
      <all/>
    </device-list>
    <address-list>
      <all/>
    </address-list>
  </profile>
  <default-profile>
    <profile id= "profile1" >
  </default-profile>
</profile-set>
```

Table 7 provides an example of the Profile Registrar document when the user preferences are not separated as 'generic preferences' vs. 'device-specific preferences'. The Profile Registrar document illustrated in Table 7 includes the following components. The user of the document has three preferences profiles named "Home", "Work" and "Travel", with the user having chosen the "profile1" profile (or "Home" profile) to be applied for his address of <sip:personal_addr@korea.com> and his device is identified by <sip:userA@mobile1.sii.samsung.com>. This means that the "profile1" profile (or "Home" profile) becomes active or gets to set as Active Profile when the user has registered with the AOR of <sip:personal_addr@korea.com> and the id of the device that the user is using is <sip:userA@mobile1.sii.samsung.com>. The user has set "profile2" profile as "Work" profile and this become active or gets to set as Active Profile when the user has registered the address of <sip:office_addr@samsung.com> and uses the device whose device address is <sip:userA@mobile2.siso.samsung.com>. The profile identified by "profile3" has the display name of "Travel" profile and this profile is set as active for all the user's registered addresses and devices.

When there are multiple profiles that are valid for the user's given condition, the best matching rule will be applied, i.e. the profile with the conditions that matches best will be selected as Active Profile. For example in Table 7, when a user has registered with the address of <sip:personal_addr@korea.com>, either "profile1" or "profile3" can be a candidate as the Active Profile. But, according to the best matching rule, the "profile1" is selected as Active Profile since "profile1" was specified as the condition for the user's AOR of <sip:personal_addr@korea.com>.

When compared to the Table 1, which is another embodiment of Profile Registrar document, the illustration in Table 7 is different by not separating between 'generic' and 'device specific' profiles. Rather, the approach taken in Table 7 has combined those where each profile can specify the condition for both user's address and device (or others if needed).

This approach in Table 7 results in the different system architecture, as shown in FIG. 8, when compared to that in FIG. 6. In FIG. 8, regardless of whether the corresponding user preferences are generic or device-specific, all user preferences can be stored in a single XDMS, called XDMS-Preferences 805. This is different from FIG. 6, where 'generic preference' is stored in XDMS-Generic Preferences 610a while the 'Device-specific preference' is stored in XDMS-Device Specific Preference 610b. Therefore, in this approach, the Application Server 115a only needs to fetch the user preferences from the single XDMS-Preferences 805.

When the User is not registered to the network, Application Server 115a may still need to apply preferences for the communication request. So the present invention uses a <default-profile> element in the Profile Registrar document which specifies the profile to be applied when the user is not registered to the network. Further, this 'default' profile can also be used as Active Profile when there is no other best matching profile in the Profile Registrar document for the given user's condition.

FIG. 8 is described in the following steps, assuming the Profile Registrar document in Table 7 and the user preferences document is in Table 6.

The Application Server 115a receives a communication request targeted to the address, for example <sip:personal_addr@korea.com>. Currently, the recipient has registered only one device identified by <sip:userA@mobile1.sii.samsung.com> in step 771.

The Application Server 115a issues XCAP GET to the Profile Registrar XDMS 510 to fetch the Profile Registrar document including the profile relationship in step 773.

The Profile Registrar XDMS 510 acknowledges by sending the 200 OK by including the Profile Registrar document in the body of 200 OK responses in step 775.

The Application Server 115a, on receiving the Profile Registrar documents, parses the document to identify the Active Profile for the device id of <sip:userA@mobile1.sii.samsung.com> and the AOR of <sip:personal_addr@korea.com>. In this example, the Active Profile is "profile1", which is "Home" profile.

The Application Server 115a requests the user preferences document for the user of <sip:personal_addr@korea.com> stored in the XDMS-Preferences 805 in step 777. The XDMS-Preferences 805 returns the user preferences document for the user of <sip:personal_addr@korea.com> in the acknowledgement in step 779. The Application Server 115a then parses the data from the user preferences document of the user <sip:personal_addr@korea.com> to obtain the preferences related to "profile1". Then, the Application Server 115a applies the obtained preferences to the communication request or the service request to the device <sip:userA@mobile1.sii.samsung.com> of the user whose address is <sip:personal_addr@korea.com>.

In another embodiment, the XCAP GET request may include the query parameter "profile1". The XDMS-Preferences 805 returns the user preferences document specific to "profile1" for the user of <sip:personal_addr@korea.com> in the acknowledgement. Upon receiving the preferences document, the Application Server 115a applies the obtained user preferences document related to "profile1" of the user <sip:personal_addr@korea.com> to the communication request or the service request to the device <sip: userA@mobile1.sii.samsung.com> of the user <sip: personal_addr@korea.com>.

Figure 9:
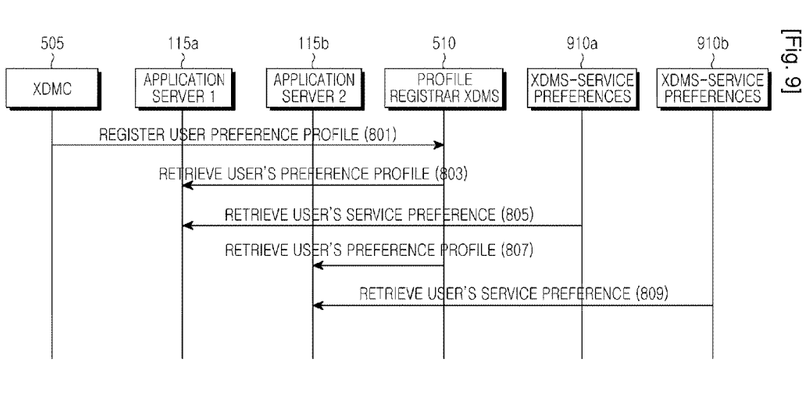
FIG. 9 is a flow diagram illustrating a method for retrieval of an Active Profile and preferences for multiple services.

FIG. 9 is a flow diagram illustrating a method for retrieval of an Active Profile and user preferences for multiple services.

In FIG. 9, the multiple services are represented by multiple Application Servers. For example, first service is represented by AS 115a and second service is represented by AS 115b. The XDMS including the user preferences for AS 115a and AS 115b could reside either in a single XDMS or each applications can have their own specific XDMS. The AS 115a has XDMS-Service Preferences 910a that contains the user preferences for the AS 115a. The AS 115b has XDM-Server Preferences 910b that contains the user preferences for the AS 115b. However, it is noted that the Profile Information in the Profile Registrar document stored in the Profile Registrar XDMS 510 is shared across the difference Application Servers. For example, the AS 115a and the AS 115b shares the Profile Information in the Profile Registrar XDMS 510 in step 801.

The AS 115a receives a communication request targeted to an recipient address, for example <sip: personal_addr@korea.com>. Consider that the recipient identified by <sip:personal_addr@korea.com> has registered only one device identified by <sip: userA@mobile1.sii.samsung.com>. Accordingly, AS 115a has to fetch the profile related data corresponding to the recipient of <sip:personal_addr@korea.com> in order to know the Profile Information that has to be applied for the handling of the incoming communication request for the first service on the recipient of <sip:personal_addr@korea.com>.

The AS 115a issues an XCAP GET message to the Profile Registrar XDMS 510 to fetch the Profile Registrar document of the recipient <sip:personal_addr@korea.com>, which includes the profile relationship. The Profile Registrar XDMS 510 acknowledges by sending the 200 OK messages. The Profile Registrar document is put in the body of the acknowledgement.

The AS 115a, on receiving the Profile Registrar document, parses the document to get the Active Profile for the recipient of <sip:personal_addr@korea.com> and the recipient's registered device of <sip: userA@mobile1.sii.samsung.com>. For example, consider that Active Profile is "profile1".

The AS 115a fetches the user preferences of the recipient of <sip:personal_addr@korea.com> from the XDMS in order to get the recipient's user preferences related "profile1" by issuing XCAP GET message.

In one example, the AS 115a can also fetch the entire user preferences of the recipient of <sip: personal_addr@korea.com> stored in the XDMS and then parse the data to collect the user preferences related to "profile1".

In another example, if the user preferences are stored in a service specific repository instead of a common repository, the Application Server has to collect the user preferences related to its application by sending the request to the application associated repository. In this case, AS 115a fetches the user preferences of the recipient of <sip: personal_addr@korea.com> from the XDMS-Services Preferences 910a in order to get the recipient's user preferences related "profile1" by issuing XCAP GET message.

The XDMS comprising the user preferences returns the "profile1" user preferences document in the 200 OK responses. Also, the Application Server can request to fetch the entire user preferences document stored at the XDMS and can then parse the user preferences related to the application.

In FIG. 9, the user preferences for the first service and second service are stored in separate service specific repositories, for example XDMS-Service Preferences 910a and XDMS-Service Preferences 910b, respectively.

Upon identifying the Active Profile (in this case 'profile1' of the recipient of <sip:personal_addr@korea.com> and fetching the user preferences for the Active Profile of the first service, the AS 115a applies the obtained user preferences to the corresponding communication requests for the recipient of <sip:personal_addr@korea.com> for the first service (steps 803 and 804).

Upon identifying the Active Profile (in this case 'profile1') of the recipient of <sip: personal_addr@korea.com> and fetching the user preferences for the Active Profile of the second service, the AS 115b applies the obtained user preferences to the corresponding communication requests for the recipient of <sip: personal_addr@korea.com> for the second service in steps 807 and 809.

Figure 10:
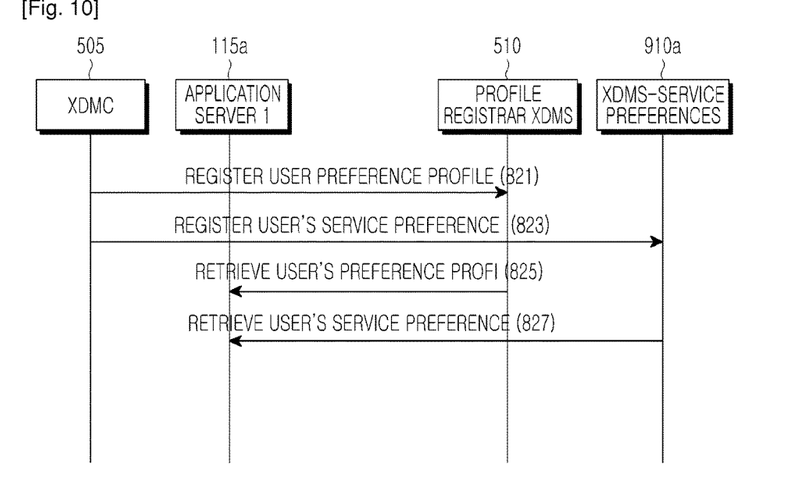
FIG. 10 is a flow diagram illustrating a method for retrieval of an Active Profile and preference for a service.

FIG. 10 is a flow diagram illustrating a method for retrieval of Active Profile and preference for a service, with the service represented by AS 115a. The XDMS including the user preference for AS 115a could reside either in a single XDMS or each application can have their own specific XDMS. The AS 115a has XDMS-Service Preferences 910a that contains the user preferences for the AS 115a.

The user registers and stores, using the XDMC 505 embedded in the user's device, the user Profile Information as Profile Registrar document in the Profile Registrar XDMS 510. Examples of the profile information can include, but are not limited to, Home and Work profile in step 821.

The user, using the XDMC 505 embedded in the user's device, stores and manages the user preferences for the application served by AS 115a in the XDMS-Service Preferences 910a in step 823. Such user preferences are described according to the Profile Information stored in the Profile Registrar XDMS 510. Hence, the user preferences in the XDMS-Service Preferences 910a contains the condition of which of the profile can make the user preferences valid and applicable.

The AS 115a receives a communication request targeted to a recipient address, for example <sip: personal_addr@korea.com>. Consider that the recipient identified by <sip:personal_addr@korea.com> has registered only one device identified by <sip: userA@mobile1.sii.samsung.com>. Therefore, the AS 115a has to fetch the profile related data corresponding to the recipient of <sip:personal_addr@korea.com> in order to know the Profile Information that has to be applied for the handling of the incoming communication request for the service on the recipient of <sip:personal_addr@korea.com>.

The AS 115a issues a XCAP GET message to the Profile Registrar XDMS 510 to fetch the Profile Registrar document of the recipient <sip:personal_addr@korea.com>, which includes the profile relationship. The Profile Registrar XDMS 510 acknowledges by sending the 200 OK messages. The Profile Registrar document is put in the body of the acknowledgement in step 825.

The AS 115a, on receiving the Profile Registrar document, parses the document to get the Active Profile for the recipient of <sip:personal_addr@korea.com> and the recipient's registered device of <sip: userA@mobile1.sii.samsung.com>. For example, consider that Active Profile is "profile1" for the recipient of <sip: personal_addr@korea.com> and the recipient's registered device of <sip:userA@mobile1.sii.samsung.com>. It is noted that the AS 115*a* decides the Active Profile among the profiles in the fetched Profile Registrar document according to the user information (in this case, user's AOR and the user's device id) that the AS 115*a* is aware of.

The AS 115*a* fetches the user preferences of the recipient of <sip:personal_addr@korea.com> from the XDMS in order to get the recipient user preferences related "profile1" for the application service provisioned by AS 115*a*, by issuing XCAP GET message in step 827.

In an embodiment, the AS 115*a* can also fetch the entire user preferences of the recipient of <sip: personal_addr@korea.com> stored in the XDMS and then parse the data to collect the user preferences related to "profile1" for the application service provided by AS 115*a*.

In another example, if the user preferences are stored in the service specific repository instead of the common repository, the Application Server has to collect the user preferences related to its application by sending the request to the application associated repository. In this case, AS 115*a* fetches the user preferences of the recipient of <sip: personal_addr@korea.com> from the XDMS-Services Preferences 910*a* in order to get the recipient's user preferences related "profile1" by issuing XCAP GET message.

The XDMS including the user preferences returns the "profile1" user preferences document in the 200 OK responses. Alternatively, AS 115*a* can request to fetch the entire user preferences document stored at the XDMS and can then parse the user preferences related to the corresponding application and the Active Profile.

As illustrated in FIG. 10, the user preferences for the service are stored in separate service specific repositories, for example XDMS-Service Preferences 910*a*.

Upon identifying the Active Profile (in this case 'profile1') of the recipient of <sip: personal_addr@korea.com> and fetching the user preferences of the application service provisioned by AS 115*a* for the Active Profile, the AS 115*a* applies the obtained user preferences to the corresponding communication requests for the recipient of <sip:personal_addr@korea.com> for the first service.

Figure 11:
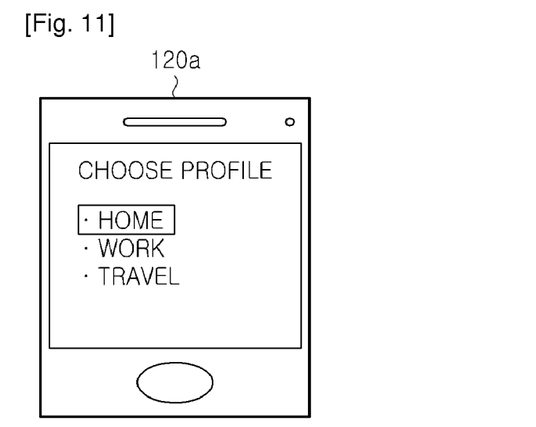
FIGS. 11-13 are illustrations of managing profiles.
Figure 12:
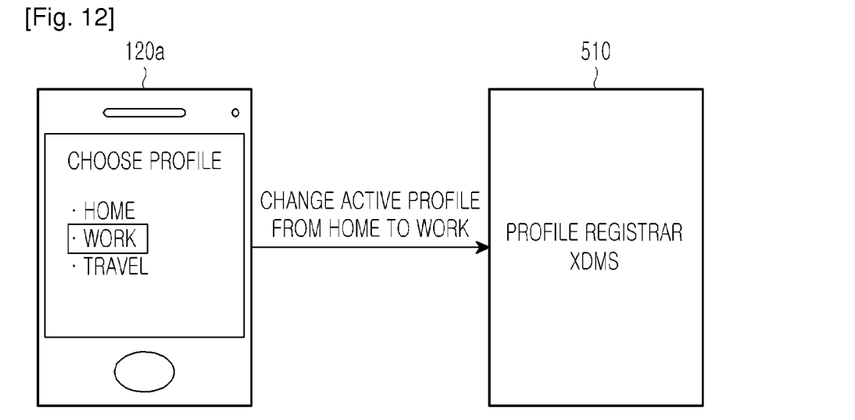
Figure 13:
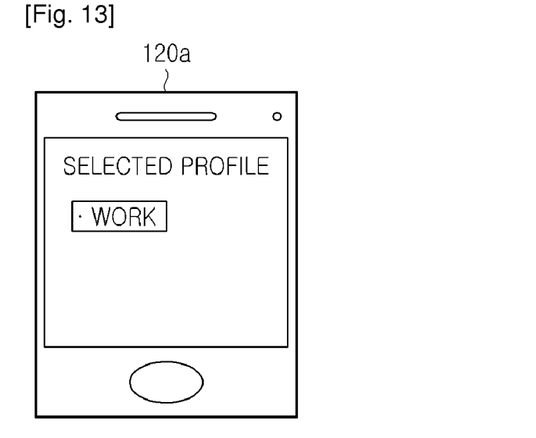

FIGS. 11 through 13 are illustrations of managing profiles.

Device 120*a* shown in FIGS. 11-13 is used by the user for managing the profiles associated with the user. The device 120*a* has a device id <sip: userA@mobile1.sii.samsung.com>, and has registered for the user whose AOR is <sip:personal_addr@korea.com>.

In the illustration of FIG. 11, the user is provided with a list of profile options displayed in the user interface (UI) of the device 120*a*, for example "Home" profile, "Work" profile and "Travel" profile. Currently the Active Profile of the device 120*a* is set to "Home" profile.

In FIG. 12, the user changes the Active Profile of the device from "Home" profile to "Work" profile by selecting the "Work" profile in the list provided in the User Interface (UI) of the device 120*a*. The device 120*a* sends a message signal to the Profile Registrar XDMS 510 for changing the Active Profile of the device 120*a*. The command can be a XCAP PUT operation. The device id, the AOR and the Active Profile to be added is sent along with the message signal. The Profile Registrar XDMS 510 changes the Active Profile of the device 120*a* to "Work" profile, in response to the received message. The updated "Work" profile is displayed as illustrated in FIG. 13.

In the above specification, the present invention and its advantages have been described with reference to specific embodiments. However, it will be apparent to a person of ordinary skill in the art that various modifications and changes can be made, without departing from the scope of the present invention, as set forth in the claims below. Accordingly, the specification and figures are to be regarded as illustrative examples of the present invention, rather than in restrictive sense. All such possible modifications are intended to be included within the scope of the present invention.

The invention claimed is:

1. A method for providing an application service based on a profile by an application server, the method comprising:
  receiving, from a device by the application server, a request for an application service;
  in response to receipt of the request, receiving, from a first server by the application server, a profile registrar document including information on a plurality of profiles stored in a second server, wherein the information on the plurality of profiles includes information indicating which profile is an active profile for the device, and wherein the first server is separate and distinct from the second server;
  receiving, from the second server by the application server, the active profile of the device from among the plurality of profiles based on the profile registrar document;
  acquiring, by the application server, user preferences from the active profile; and
  providing, to the device by the application server, the application service to which the user preferences are applied,
  wherein the method further comprises:
    receiving, by the application server, an active profile change request from the device;
    acquiring, by the application server, a profile registrar document corresponding to a user of the device;
    finding, by the application server, a profile associated with an identifier of the device and an Address of Record (AOR) corresponding to the device in the profile registrar document corresponding to the user of the device, wherein the identifier of the device and the AOR corresponding to the device are included in the active profile change request; and
    changing, by the application server, a current active profile from the found profile to a profile included in the active profile change request.

2. The method of claim 1, wherein the user preferences comprise a generic preference and a device specific preference that is applied only to a specific device.

3. The method of claim 1, wherein receiving the profile registrar document comprises:
  sending an eXtensible markup language Configuration Access Protocol (XCAP) GET message to the first server storing the profile registrar document; and
  receiving the profile registrar document along with a 200 OK response.

4. The method of claim 1, wherein receiving the active profile comprises:
  sending an eXtensible markup language Configuration Access Protocol (XCAP) GET message to the second server storing the active profile; and
  receiving the active profile along with a 200 OK response.

5. An application server providing an application service based on a profile, the application server comprising:

a communication interface for transmitting and receiving signals; and a processor configured for:
  receiving, from a device, a request for an application service;
  in response to receipt of the request, receiving a profile registrar document including information on a plurality of profiles stored in a second server, wherein the information on the plurality of profiles includes information indicating which profile is an active profile for the device, and wherein the first server is separate and distinct from the second server;
  receiving, from the second server, the active profile of the device from among the plurality of profiles based on the profile registrar document;
  acquiring user preferences from the active profile; and
  providing, to the device, the application service to which the user preferences are applied, wherein the processor is further configured to:
  receive an active profile change request from the device;
  acquire a profile registrar document corresponding to a user of the device;
  find a profile associated with an identifier of the device and an Address of Record (AOR) corresponding to the device, which are included in the active profile change request, in the profile registrar document corresponding to the user of the device; and
  change a current active profile from the found profile to a profile included in the active profile change request.

6. The application server of claim 5, wherein the user preferences comprise a generic preference and a device specific preference that is applied only to a specific device.

7. The application server of claim 5, wherein the processor sends an eXtensible markup language Configuration Access Protocol (XCAP) GET message to the first server storing the profile registrar document in order to acquire the profile registrar document, and the profile registrar document is delivered along with a 200 OK response.

8. The application server of claim 5, wherein the processor sends an eXtensible markup language Configuration Access Protocol (XCAP) GET message to the second server storing the active profile, and the processor receives the active profile along with a 200 OK response.

* * * * *